(12) United States Patent
Schmid

(10) Patent No.: US 10,589,975 B2
(45) Date of Patent: Mar. 17, 2020

(54) DEVICE FOR FILLING CONTAINERS IN A BEVERAGE FILLING SYSTEM

(71) Applicant: KRONES AG, Neutraubling (DE)

(72) Inventor: Manfred Schmid, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 15/579,925

(22) PCT Filed: Apr. 20, 2017

(86) PCT No.: PCT/EP2017/059380
§ 371 (c)(1),
(2) Date: Dec. 5, 2017

(87) PCT Pub. No.: WO2017/182563
PCT Pub. Date: Oct. 26, 2017

(65) Prior Publication Data
US 2018/0222736 A1    Aug. 9, 2018

(30) Foreign Application Priority Data
Apr. 20, 2016    (DE) .................. 10 2016 107 355

(51) Int. Cl.
*B67C 3/00* (2006.01)
*B67C 3/22* (2006.01)
*F16J 15/00* (2006.01)

(52) U.S. Cl.
CPC .............. *B67C 3/001* (2013.01); *B67C 3/22* (2013.01); *F16J 15/00* (2013.01)

(58) Field of Classification Search
CPC .. B67C 3/02; B67C 3/22; B67C 3/225; B67C 3/28
(Continued)

(56) References Cited

U.S. PATENT DOCUMENTS

| | | | | |
|---|---|---|---|---|
| 2,761,606 A | * | 9/1956 | Pahl | B67C 3/2637 141/140 |
| 2,913,016 A | * | 11/1959 | Luther | B67C 3/16 141/7 |
| 3,804,135 A | * | 4/1974 | Waxlax | B65B 3/323 141/266 |

(Continued)

FOREIGN PATENT DOCUMENTS

| CN | 101081687 | 10/2012 |
|---|---|---|
| CN | 101376488 | 10/2012 |

(Continued)

OTHER PUBLICATIONS

Chinese Office Action, Chinese Patent Application 201780001916.0, dated May 17, 2019, 6 pages.

Primary Examiner — Timothy L Maust
(74) Attorney, Agent, or Firm — Haynes and Boone, LLP

(57) ABSTRACT

A device and a method for filling at least one container with a filling product in a beverage filling plant are described. The device includes a product holding vessel for accommodating the filling product, and at least one filling element communicating with the product holding vessel for filling the container with the filling product, and a product feed tube for feeding a filling product into the product holding vessel. A seal for sealing the product feed tube with respect to an interior space of the product holding vessel is provided. The seal can be switched between a sealing position for cleaning and a non-sealing position for the filling operation.

19 Claims, 3 Drawing Sheets

(58) Field of Classification Search
USPC .......................................... 141/89, 144–147
See application file for complete search history.

(56) References Cited

U.S. PATENT DOCUMENTS

| | | | | |
|---|---|---|---|---|
| 3,850,345 | A | * | 11/1974 | Merritt .................... B65B 3/323 <br> 222/168.5 |
| 4,456,040 | A | * | 6/1984 | Bacroix .................... B67C 3/02 <br> 141/150 |
| 5,054,527 | A | * | 10/1991 | Rozier .................. B24B 53/001 <br> 141/147 |
| 5,356,041 | A | * | 10/1994 | Hellenberg ......... B01F 13/1058 <br> 222/135 |
| 5,944,072 | A | * | 8/1999 | Tietz ....................... B67C 3/204 <br> 141/146 |
| 5,960,838 | A | * | 10/1999 | Tietz ....................... B67C 3/204 <br> 134/169 R |
| 6,079,460 | A | * | 6/2000 | Ballan ..................... B67C 3/005 <br> 141/145 |
| 8,857,478 | B2 | * | 10/2014 | Klarl ........................ B67C 3/22 <br> 141/144 |

FOREIGN PATENT DOCUMENTS

| | | |
|---|---|---|
| CN | 101811654 | 8/2014 |
| CN | 102616711 | 1/2016 |
| CN | 103723666 | 8/2016 |
| CN | 104755411 | 11/2016 |
| DE | 20120014 | 2/2003 |
| DE | 102013102594 | 9/2014 |
| GB | 2067530 | 7/1981 |
| WO | WO 2014/139627 | 9/2014 |

* cited by examiner

DEVICE FOR FILLING CONTAINERS IN A BEVERAGE FILLING SYSTEM

CROSS REFERENCE TO RELATED APPLICATIONS

This application is a national stage of International Application No. PCT/EP2017/059380, filed Apr. 20, 2017, which claims priority from German Patent Application No. 10 2016 107 355.5 filed on Apr. 20, 2016 in the German Patent and Trademark Office, the disclosures of which are incorporated herein by reference in their entirety.

BACKGROUND

Technical Field

The present invention relates to a device and a method for filling at least one container with a filling product in a beverage filling plant, the device including a product holding vessel for accommodating the filling product, and at least one filling element communicating with the product holding vessel for filling the container with the filling product, and a product feed tube for feeding a filling product into the product holding vessel, wherein a seal for sealing the product feed tube with respect to the interior space of the product holding vessel is provided.

Related Art

In rotary filling plants, filling products, and other media which are needed when filling containers with the filling product, are normally transferred via a rotary media distributor from a stationary part of the plant to a rotating part of the plant. The rotary media distributor usually comprises a stationary shaft and, rotating with the filler carousel, a distribution head with a housing. The individual media are transferred via rotary distributor lines, which generally have a plurality of sealing lips to seal the individual rotary distributor lines against each other.

A disadvantage of such a rotary distributor is the susceptibility to wear of the elements that rotate relative to each other, in particular the sealing lips. Not only does the wear lead to short service life of the beverage filling plant, but abraded material can also cause contamination of the filling product.

From GB 2 067 530 A, a beverage filling plant is known which dispenses with the use of a rotary media distributor, and instead discloses a stationary tube, which leads into a rotating product holding vessel for supplying filling product. The interior space of the product holding vessel is sealed against the environment via a rotary seal between the tube and the product holding vessel.

A disadvantage of this beverage filling plant is, however, that the pressure equalization in the interior of the container that is necessary during filling operation can only be made possible by means of an appropriate control and regulation system and an exchange of gas between the container to be filled and the product holding vessel. A further disadvantage lies in the rotary seal, which can produce abraded matter which can lead to contamination of the filling product. In addition, the rotary seal itself is subject to wear, and this can contribute to a reduction in the operating times of the beverage filling plant.

SUMMARY

An improved device and an improved method for filling at least one container with a filling product in a beverage filling plant is described.

Accordingly, a device for filling at least one container with a filling product in a beverage filling plant is proposed, including a product holding vessel for accommodating the filling product, and at least one filling element communicating with the product holding vessel for filling the container with the filling product, and a product feed tube for feeding filling product into the product holding vessel, wherein a seal for sealing the product feed tube with respect to an interior space of the product holding vessel is provided. The seal can be switched between a sealing position for cleaning and a non-sealing position for the filling operation.

By this means, non-pressurized filling of the at least one container with the filling product is possible. Thus during the filling operation the seal is in a non-sealing position, by means of which the interior space of the product holding vessel, in particular the gas above the filling product in the product holding vessel, is in fluid connection with an immediate environment of the product holding vessel. By means of this fluid connection, it is possible to equalize an underpressure in the product holding vessel, which arises due to the dispensing of filling product from the product holding vessel to the applicable filling element.

Due to the fact that the product feed tube is sealed with respect to an interior space of the product holding vessel by means of the seal, the preconditions are created for the cleaning of the device, in particular for clean-in-place (CIP) cleaning, in which the cleaning medium is introduced and kept under pressure. In cleaning operation, a cleaning medium is supplied under pressure to the product holding vessel via the product feed tube or cleaning nozzles disposed in the product holding vessel, in order to flush all components that come into contact with the product. The filling elements that are connected with the product holding vessel are for example closed with the aid of CIP caps, so that the cleaning medium originating from the product holding vessel can also rinse the filling elements.

In order to provide an appropriate cleaning cycle, by means of which the components that come into contact with the product are flushed, an overpressure must be created in the interior of the components that communicate with each other, in particular in the product holding vessel. An appropriate overpressure can, however, only be established and maintained in the device if the seal has adopted the sealing position for the cleaning process.

In one embodiment, the product holding vessel has an aperture through which the product feed tube is guided into the product holding vessel, wherein between the aperture and the product feed tube a gap is provided which can be closed by means of the seal.

If, during filling operation, the seal is in the non-sealing position, the interior space of the product holding vessel, for example the gas above the filling product in the product holding vessel, communicates with the environment of the product holding vessel. The pressure equalization that is necessary for filling containers can thereby take place via the gap between the product holding vessel and the product feed tube, in the area of the aperture in the product holding vessel.

In order to enable an overpressure required for cleaning to build up in the interior of the product holding vessel, the gap between the product holding vessel and the product feed tube in the area of the aperture in the product holding vessel can be sealed by the seal. The interior space of the product holding vessel then communicates only with components of the plant that come into contact with the product.

In some embodiments, the product feed tube is disposed stationary and concentric to the product holding vessel, wherein the product holding vessel is disposed such that it can rotate about the product feed tube.

By this means it is possible to feed the filling product to the product holding vessel without the use of a rotary media distributor. Accordingly, the device can dispense with the use of dynamic seals. Dynamic seals are parts that are subject to wear, and which have a comparatively short service life. The use of dynamic seals, for example in rotary media distributors, leads to short operating periods of the beverage filling plant, since the dynamic seals need frequent maintenance due to their short service lives. A further disadvantage of dynamic seals is that abraded particles from the seals can enter the filling product and thereby contaminate it.

A further advantage of the proposed device, in contrast to a rotary media distributor, is that no lubricating grease is required for providing the supply of product from the product feed tube. Such greases not only have negative effects on the manufacturing costs, but also pose a risk that grease will contaminate the filling product.

Dispensing with a rotary media distributor also has advantageous effects on the cleaning expenditure, enabling a saving of both the time needed to clean the rotary media distributor and the required media.

In all, by means of a stationary product feed tube, about which the product holding vessel rotates in a contactless manner during filling operation, it is possible to provide a comparatively low-maintenance device for filling at least one container with a filling product, with lower investment costs and lower operating and manufacturing costs.

In certain embodiments, the seal is disposed on the product feed tube, typically on an outer peripheral surface of the product feed tube, or on the product holding vessel, for example on an aperture of the product holding vessel.

Accordingly, the seal is disposed at a position which does not come into contact with the filling product. If the seal is in the non-sealing position for filling operation, it is only exposed to a flow of the gas that flows between the interior space of the vessel and the environment of the vessel in order to enable a pressure equalization for the filling operation.

In various embodiments, the product feed tube and the product holding vessel are at least in part enclosed by an isolator.

By this means it is ensured that the gas in the environment of the product holding vessel, with which the interior space of the product holding vessel is in fluid communication during filling operation, does not exceed a maximum number of particles of specified particle sizes per cubic meter, and in particular contains no microorganisms. The environment of the product holding vessel thus, in several embodiments, forms a part of a clean room, which is enclosed by the isolator. The non-sealing position of the seal is accordingly not prejudicial to the filling operation, since an exchange of gas for pressure equalization in the interior space of the product holding vessel takes place only with an area which is part of the clean room.

In certain embodiments, the product feed tube is guided into the isolator in a sealed manner via a seal, for example a bellows. By this means it is possible for a part of the product feed tube to be outside the isolator, in order for example to lead to a product tank. The clean room or the aseptic area can thereby be kept as small as possible. Parts of the plant that do not require a clean room environment, such as for example drive elements, are accordingly disposed outside the clean room.

If the seal between the product feed tube and the isolator is designed in the form of a bellows, it can compensate for vertical displacements of the product feed tube relative to the isolator in the direction of the longitudinal axis of the product feed tube. The clean room, which is enclosed by the isolator, thereby remains sealed against the environment, even in the event of vertical displacements of the product feed tube.

In a further embodiment, during filling operation, in which the seal is in the open position, the interior space of the product holding vessel communicates with the interior space of the isolator in order to equalize pressures.

By this means, non-pressurized filling of at least one container with the filling product is enabled. Due to filling product leaving the product holding vessel via at least one filling element, an underpressure arises in the product holding vessel. The pressure in the product holding vessel must be equalized, because otherwise the underpressure will prevent further filling product from leaving the product holding vessel via the at least one filling element. Because the seal is in the open position, by means of which the interior space of the product holding vessel is in fluid communication with the interior space of the isolator, a gas can flow from the interior space of the isolator into the interior space of the product holding vessel, and so bring about pressure equalization in the interior space of the product holding vessel.

Because the interior space of the isolator forms a clean room, in whose gas volume a specified number of particles of specified particle sizes per cubic meter is not exceeded, and the clean room is normally free of microorganisms, it is ensured that the gas which flows during the filling operation from the interior space of the isolator into the interior space of the product holding vessel for pressure equalization does not lead to contamination of the filling product or the interior space of the product holding vessel.

In a further embodiment, the product feed tube and/or the product holding vessel can be displaced between an open and a sealing position, wherein the seal is displaceable relative to the product holding vessel and/or the product feed tube. In particular, the product feed tube can be raised or lowered, in order in this manner to switch the seal between the sealing position and the non-sealing position.

If the product feed tube is displaceable, it is possible to switch between the position for filling operation and the position for cleaning by displacing the product feed tube in the direction of its longitudinal axis. If the seal is disposed on an outer peripheral surface of the product feed tube, the product feed tube can be displaced together with the seal in the direction of the longitudinal axis of the product feed tube, until the seal forms a seal against the product feed tube and thereby prevents communication between the interior space of the product holding vessel and an environment of the product holding vessel. In order to enable non-pressurized filling operation, the product feed tube is displaced together with the seal in the opposite direction, so that there is no longer contact between the seal and the product holding vessel. By this means a gap can be provided between the outer peripheral surface of the product feed tube and an aperture in the product holding vessel, so that a gas can flow between the interior space of the product holding vessel and the environment of the product holding vessel, in order to enable pressure equalization.

If the seal is in the open position during filling operation, there is no connection between the product feed tube and the product holding vessel. Accordingly it is possible for the product holding vessel to rotate relative to and about the product feed tube, without material abrasion of parts that abrade against each other. The seal typically only contacts the product holding vessel when the product holding vessel has no rotational movement relative to the product feed tube, which can be the case, for example, during cleaning operation. It is therefore unnecessary to design the seal for a dynamic load.

Alternatively, the product holding vessel can be designed to be displaceable between an open and a sealing position, i.e. capable of being raised and lowered. For example the product holding vessel can be disposed such that it is displaceable in the direction of the longitudinal axis of the product feed tube. In this case, during the non-pressurized filling operation there is no contact between the product holding vessel and the seal which is disposed on the product feed tube. The product holding vessel can rotate relative to and about the product feed tube without contact, wherein a gas exchange between the interior of the product holding vessel and an environment of the product holding vessel can take place. In order to prepare for cleaning operation, the product holding vessel is displaced relative to the product feed tube in the direction of the longitudinal axis of the product feed tube, until the product holding vessel, for example an aperture of the product holding vessel, contacts the seal that is disposed on the product feed tube. By this means the interior space of the product holding vessel is separated from the environment of the product holding vessel. In particular, no fluid communication exists between the interior space and the other parts of the clean room.

Alternatively, the seal can be disposed on the product holding vessel, and be in contact with the product feed tube in the sealing position.

In a further embodiment, at least one vertical displacement device, for example a pneumatic cylinder, is disposed on the product feed tube and/or the product holding vessel, in order to provide a vertical displacement between the open and the sealing position. By this means it is possible to provide the vertical displacement that is needed in order to change between the position for filling operation and the position for cleaning.

In some embodiments, the seal is an O-ring or a sealing lip. If the seal is provided in the form of an O-ring, the O-ring can be disposed on the outer peripheral surface of the product feed tube or on an aperture of the product holding vessel, in particular disposed circumferentially around a circular aperture. An O-ring is particularly suitable for use as a static seal.

Alternatively, a sealing lip can be disposed circumferentially around the product feed tube or on the product holding vessel. The sealing lip is also suitable for dynamic loads. Thus it is possible to seal the interior space of the product holding vessel against the environment of the product holding vessel, even if the product holding vessel executes a rotational movement relative to the product feed tube. Because rotational movements of the product holding vessel relative to the product feed tube in the sealing position are generally not envisaged for present device, the sealing lip serves primarily as a static seal of the product holding vessel against the product feed tube, wherein in the unforeseen event that, in the sealing position, a relative rotational movement between the product holding vessel and the product feed tube nevertheless takes place, the sealing effect of the seal can be maintained.

A method for cleaning a device for filling containers with a filling product in a beverage bottling plant is described, wherein the device is in several embodiments designed according to one of the aspects described above. The method includes sealing a product feed tube against a product holding vessel for the cleaning operation, cleaning the device, in particular the product holding vessel, and opening the seal between the product feed tube and the product holding vessel for the filling operation.

With the aid of this method, the advantages described above in reference to the device are also achieved.

BRIEF DESCRIPTION OF THE FIGURES

Further embodiments and aspects of the present invention are more fully explained by the description below of the figures.

DETAILED DESCRIPTION

Examples of embodiments are described below with the aid of the figures. In the figures, elements which are identical or similar, or have identical effects, are designated with identical reference signs. In order to avoid redundancy, repeated description of these elements is in part dispensed with in the description below.

Figure 1:
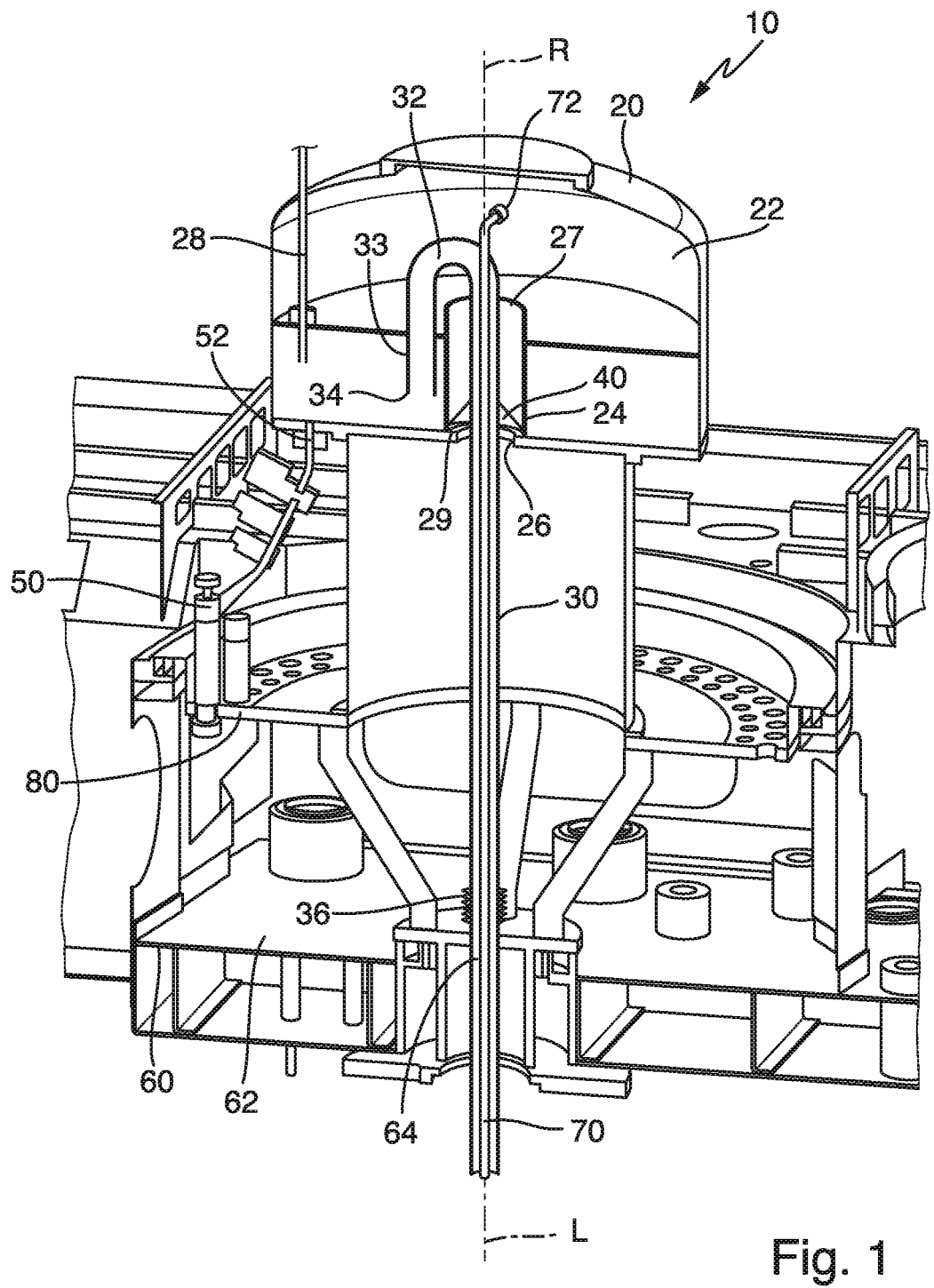
FIG. 1 is a schematic sectional view of a device for filling at least one container with a filling product in a beverage filling plant, wherein the device is in filling operation.
Figure 2:
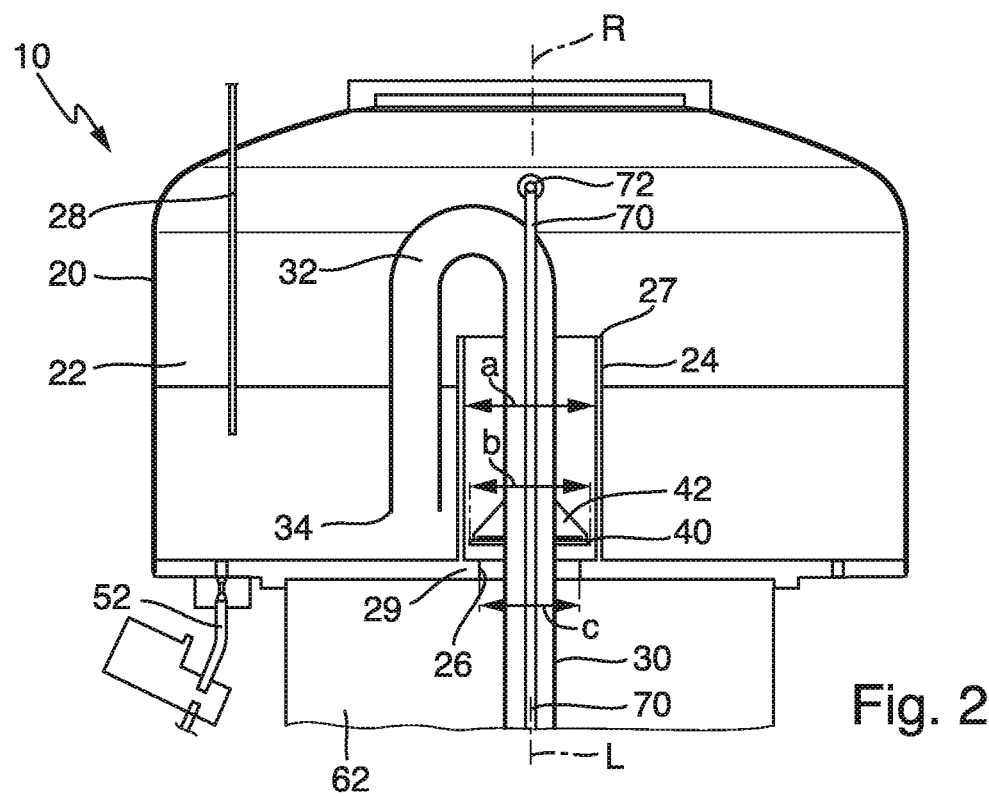
FIG. 2 is a schematic detail view of the device from FIG. 1.

FIG. 1 shows a sectional view of a device 10 for filling at least one container (not shown here) with a filling product in a beverage filling plant. The device 10 includes a product holding vessel 20 for accommodating the filling product. The product holding vessel 20 that is shown in FIGS. 1 and 2 is in filling operation, in which the product holding vessel 20 rotates about a vertically disposed axis of rotation R. In a base area of the product holding vessel 20, a filling element supply line 52 is disposed, through which the filling product can flow from the product holding vessel 20 to a filling element 50. In filling operation, the product holding vessel 20, the filling element supply line 52 and the filling element 50 rotate together with a rotary plate 80 of the beverage filling plant about the axis of rotation R. The rotary plate 80 serves to accommodate at least one filling element 50.

FIGS. 1 and 2 further show that the product holding vessel 20 has an aperture 26 disposed centrally in its base area. The aperture 26 is surrounded by a tube-shaped inner wall 24 in an interior space 22 of the product holding vessel 20. The tube-shaped inner wall 24 extends vertically in the interior space 22 of the product holding vessel 20, and ends above a fill level of the filling product accommodated in the product holding vessel 20. The tube-shaped inner wall 24 has at its upper end a second aperture 27, which communicates with the interior space 22. In order to ensure that the fill level of the filling product accommodated in the product holding vessel 20 does not rise to, or beyond, the height of the interior wall 24, and flow out of the product holding vessel 20 via the second aperture 27, the product holding vessel 20 has a fill level sensor 28. If a predetermined fill level is detected by means of the fill level sensor 28, a filling product supply to the product holding vessel 20 can be interrupted.

The first aperture 26, the inner wall 24 and the second aperture 27 of the product holding vessel 20 serve to guide a product feed tube 30 for feeding filling product into the interior space 22 of the product holding vessel 20. The product feed tube 30 runs vertically along a longitudinal axis L, and enters the product holding vessel 20 from below through the first aperture 26 of the product holding vessel 20. The product feed tube 30 further extends parallel to the tube-shaped inner wall 24 and then through the second aperture 27. Above the second aperture 27 of the product holding vessel 20, the product feed tube 30 has a section 32 which is bent back. The bent-back section 32 is U-shaped and leads to an end section 33 of the product feed tube 30, which runs parallel to the longitudinal axis L from the bent-back section 32 to a product feed tube aperture 34. The product feed tube 30 is accordingly bent around the tube-shaped inner wall 24, so that filling product can be fed to the product holding vessel 20.

In the device 10 that is shown in FIGS. 1 and 2, the product feed tube aperture 34 is disposed below the second aperture 27 of the product holding vessel 20. Together with the fill level sensor 28, this arrangement can ensure that the filling product that is fed via the product feed tube 30 to the product holding vessel 20 does not then escape from the interior space 22 of the product holding vessel 20 via the second aperture 27.

The arrangement of the device 10 that is shown in FIGS. 1 and 2 enables an equalization of pressure between the interior space 22 of the product holding vessel 20 and an environment of the product holding vessel 20 during filling operation. This is necessary because during filling operation the outflow of filling product through the filling element supply line 52 can cause an underpressure to arise in the interior space 22 of the product holding vessel 20. If this underpressure is not equalized, the filling operation cannot continue, since an underpressure that prevails in the product holding vessel 20 prevents the outflow of filling product through the filling element supply line 52. Accordingly, a gas space in the interior space 22 above the filling product communicates with the environment via the second aperture 27, the tube-shaped inner wall 24 and the first aperture 26. Gas flows from the environment through the first aperture 26 into the interior space 22 of the product holding vessel 20, so that the pressure in the interior space 22 corresponds to the environmental pressure, and the filling product can thus leave the product holding vessel 20 via the filling element supply line 52.

The environment below the product holding vessel 20 is part of a clean room 62, which is enclosed by a schematically indicated isolator 60. The clean room 62 enclosed by the isolator 60 forms an aseptic area which meets the hygiene requirements for filling in the food industry. In the clean room 62, a specified particle count and particle size per cubic meter of air volume is not exceeded. The gas, i.e. the air which flows during filling operation through the first aperture 26 into the interior space 22 of the product holding vessel 20, comes from a part of the clean room 62 below the product holding vessel 20. By this means it is ensured that the filling product is not contaminated by the air that flows into the product holding vessel 20 for pressure equalization.

FIGS. 1 and 2 further show a seal 40, which is disposed on the outer peripheral surface of the product feed tube 30 above the aperture 26 of the product holding vessel 20. The first aperture 26 of the product holding vessel 20 has a smaller diameter than the tube-shaped inner wall 24, and by this means an annular protrusion 29 is provided between the first aperture 26 and the tube-shaped inner wall 24. The seal 40 disposed on the outer peripheral surface of the product feed tube 30 has an annular design. It can be seen from FIG. 2 that the seal 40 is disposed over a mounting 42 on the outer peripheral surface of the product feed tube 30. The seal 40 has an external diameter b, which is smaller than an internal diameter a of the tube-shaped inner wall 24 and greater than a diameter c of the first aperture 26. FIGS. 1 and 2 therefore show a non-sealing position of the seal 40.

Because the interior space 22 of the product holding vessel 20 is in fluid communication with the environment of the product holding vessel 20, i.e. the clean room 62, the pressure in the interior space 22 depends on the pressure prevailing in the clean room 62. During cleaning operation, it is however necessary to provide an overpressure in the product holding vessel 20 in order, for instance during a CIP cleaning process, to rinse the parts of the beverage filling plant which come into contact with the filling product during filling operation. By means of this, it is also possible to spray the cleaning medium.

Figure 3:
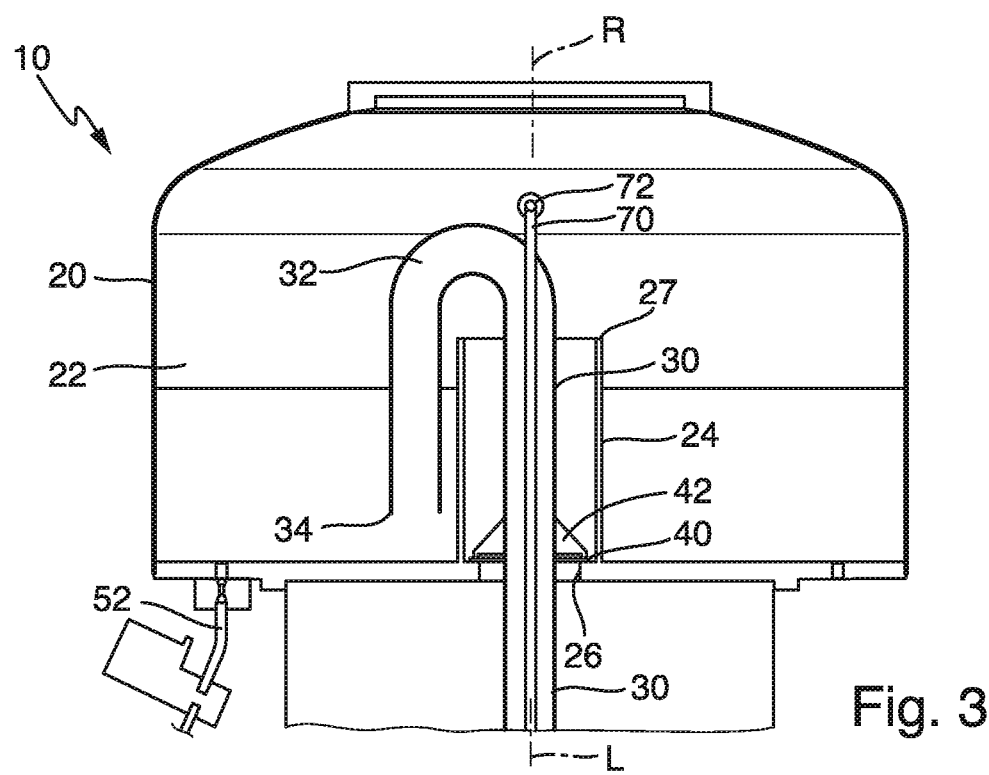
FIG. 3 is a schematic detail view of the device from FIG. 1, wherein the device is in cleaning operation.

In order to create an overpressure in the product holding vessel 20, the seal 40 is lowered onto the protrusion 29. By this means the first aperture 26 of the product holding vessel 20 can be closed. A sealing position of the seal 40 is shown in FIG. 3. In order for the seal 40, which is disposed on the outer peripheral surface of the product feed tube 30, to be displaceable from a non-sealing position to a sealing position, and vice versa, the product feed tube 30 is designed to be displaceable in the direction of the longitudinal axis L. In order to bring the seal 40 from the non-sealing position that is shown in FIGS. 1 and 2 to the sealing position that is shown in FIG. 3, the product feed tube 30 displaces downwards in the direction of the longitudinal axis L. By means of an upwards displacement of the product feed tube, the seal 40 can be brought from the sealing position that is shown in FIG. 3 to the non-sealing position that is shown in FIGS. 1 and 2.

The product feed tube 30 passes from a region outside the isolator 60, through the clean room 62, into the product holding vessel 20. In order to enable the upwards or downwards displacement of the product feed tube 30, and at the same time to seal the product feed tube 30 against the isolator 60 in the area in which it enters the isolator 60, a bellows 36, shown in FIG. 1, is provided. One end of the bellows 36 is disposed on the outer peripheral surface of the product feed tube 30. The other end of the bellows 36 is connected with the isolator 60, which, in the area in which the product feed tube 30 enters, is formed by a rotary plate support 82. The rotary plate support 82 has in its center an aperture 84, through which the product feed tube 30 passes. If the product feed tube 30 displaces upwards in the direction of the longitudinal axis L, the bellows 26 is stretched. If the product feed tube 30 undergoes a downwards displacement along the longitudinal axis L, the bellows 26 is folded together. Accordingly, the bellows 36 seals the product feed tube 30 dynamically against the rotary plate support 82, and hence the isolator 60.

FIGS. 1 to 3 show that a cleaning line 70 runs through the interior of the product feed tube 30 and concentrically to it. The cleaning line 70 leaves the product feed tube 30 in the area of the bent-back section 32 of the product feed tube 30, so that the end of the line 70 protrudes into the interior space 22 of the product holding vessel 20. At the end of the cleaning line 70 at least one spray nozzle 72 is disposed, by means of which a cleaning medium can be introduced into the product holding vessel 20.

The cleaning medium is sprayed into the interior space 22 of the product holding vessel 20, via the at least one spray nozzle 72, when the seal 40 is in the sealing position that is shown in FIG. 3. By this means it is possible to build up an overpressure in the interior space 22 of the product holding vessel 20 during cleaning operation, and by means of this to clean, for example by steam treatment, not only the interior space 22 but also the filling element 50 that is connected with the product holding vessel 20.

The cleaning line 70 is connected with the product feed tube 30 such that it accompanies the vertical displacement of the product feed tube 30.

Figure 4:
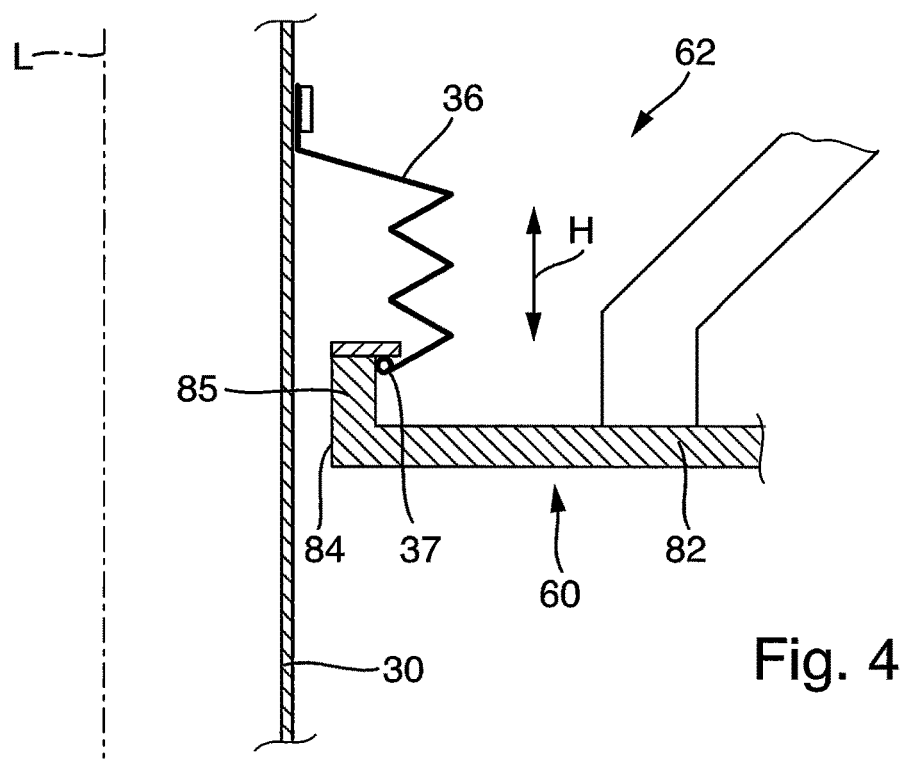
FIG. 4 is a schematic detail view of a seal of a product feed tube against an isolator.

FIG. 4 shows a detail view of the area of the isolator 60 in which the product feed tube 30 passes through the aperture 84 in the rotary plate support 82. The bellows 36 is fixed non-rotatably on the peripheral surface of the product feed tube 30. The other end of the bellows 36 is arranged via a seal 37 on the outer peripheral surface of a tube-shaped protrusion 85 of the aperture 84. The tube-shaped protrusion 85 of the aperture 84 is concentric to the longitudinal axis L of the product feed tube 30.

Because the rotary plate support 82 rotates relative to the product feed tube 30, the seal 37 is designed in the form of a rotary seal. The bellows is designed such that it allows the maximum vertical displacement H of the product feed tube 30, while at the same time providing sealing of the clean room 62 against the environment.

Figure 5:
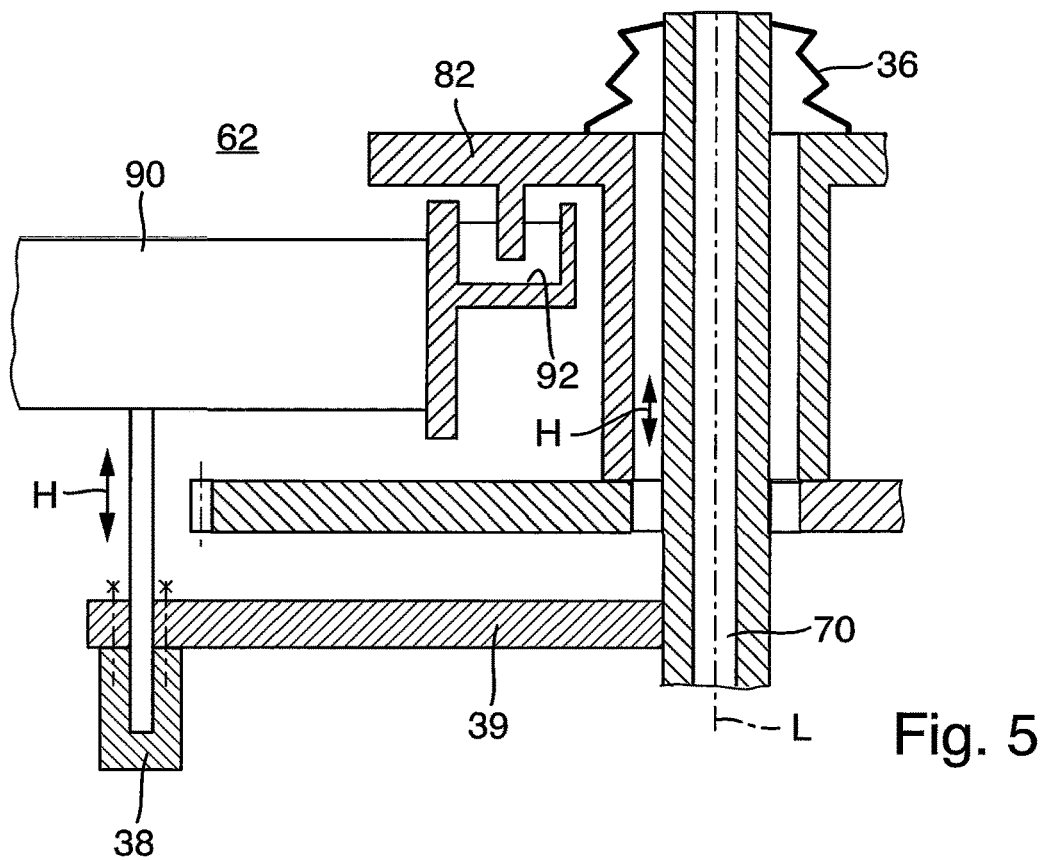
FIG. 5 is a schematic detail view of a vertical displacement device of the product feed tube.

FIG. 5 shows a vertical displacement device 38 for providing the upwards or downwards displacement H of the product feed tube 30 and the cleaning line 70. The vertical displacement device 38 is a pneumatic cylinder, which is connected with the product feed tube 30 via an arm 39, and can raise and lower the product feed tube 30 and the cleaning line 70. The vertical displacement device 38 is supported on a stationary front table 90, which forms part of the isolator 60 and separates the clean room 62 from the environment. A total of three vertical displacement devices are arranged around the product feed tube 30, at an angle of 120° to each other. Alternatively, one, two, four, five or more vertical displacement devices can be provided.

In order that the rotary plate support 82 can rotate relative to the stationary front table 90, while still enabling the isolation of the clean room 62 from the environment, the rotary plate support 82 and the front table 90 are sealed against each other via a water seal 64. To form this, in the front table a water-filled annular groove 92 is disposed, through which an annular protrusion extending from the underside of the rotary plate support 82 can rotate.

To the extent applicable, all individual features described in the example embodiments can be combined with each other and/or exchanged, without departing from the field of the invention.

The invention claimed is:

1. A device for filling at least one container with a filling product in a beverage filling plant comprising:
   a product holding vessel configured to accommodate the filling product;
   at least one filling element configured to fill the container with the filling product and in communication with the product holding vessel;
   a product feed tube configured to feed the filling product into the product holding vessel, wherein the product holding vessel comprises an aperture through which the product feed tube is guided into the product holding vessel; and
   a first seal configured to seal the product feed tube with respect to an interior space of the product holding vessel, wherein the first seal is configured to be switched between a sealing position and a non-sealing position.

2. The device of claim 1, wherein the aperture and the product feed tube form a gap therebetween, and the first seal is configured to close the gap.

3. The device of claim 1, wherein the product feed tube is disposed concentric to the product holding vessel.

4. The device of claim 3, wherein the product holding vessel is rotatable about the product feed tube.

5. The device of claim 1, wherein the first seal is disposed on the product feed tube or the product holding vessel.

6. The device of claim 5, wherein the first seal is disposed on an outer peripheral surface of the product feed tube or on an aperture of the product holding vessel.

7. The device of claim 1, further comprising an isolator configured to enclose the product feed tube and the product holding vessel at least in part.

8. The device of claim 7, further comprising a second seal configured to guide the product feed tube into the isolator.

9. The device of claim 8, wherein the second seal comprises a bellows.

10. The device of claim 7, wherein when the first seal is in the non-sealing position, an interior space of the product holding vessel is in communication with an interior space of the isolator to equalize pressures.

11. The device of claim 1, wherein the product feed tube and/or the product holding vessel are displaceable between an open position and a sealing position, and the first seal is displaceable relative to the product holding vessel and/or the product feed tube.

12. The device of claim 11, further comprising at least one vertical displacement device disposed on the product feed tube and/or the product holding vessel to provide a vertical displacement between the open position and the sealing position.

13. The device of claim 12, wherein the at least one vertical displacement device comprises a pneumatic cylinder.

14. The device of claim 1, wherein the first seal comprises an O-ring seal or a sealing lip.

15. A method for cleaning the device of claim 1, comprising:
   sealing the product feed tube against the product holding vessel;
   cleaning the product holding vessel; and
   opening the first seal between the product feed tube and the product holding vessel.

16. A device for filling at least one container with a filling product in a beverage filling plant comprising:
   a product holding vessel configured to accommodate the filling product;
   at least one filling element configured to fill the container with the filling product and in communication with the product holding vessel;
   a product feed tube configured to feed the filling product into the product holding vessel;
   a seal configured to seal the product feed tube with respect to an interior space of the product holding vessel, wherein the seal is configured to switch between a sealing position and a non-sealing position; and
   a cleaning line connected to and disposed in an interior of the product feed tube.

17. The device of claim 16, wherein the cleaning line comprises a spray nozzle disposed at an end of the cleaning line that protrudes into the interior space of the product holding vessel.

18. The device of claim 16, further comprising at least one vertical displacement device disposed on the product feed tube and/or the product holding vessel that provides a vertical displacement of the product feed tube and the cleaning line.

19. The device of claim 16, wherein the seal is disposed on an outer peripheral surface of the product feed tube or on an aperture of the product holding vessel.

* * * * *